J. A. BASSETT.
Making Oil and Water Gas.
No. 35,807. Patented July 8, 1862.
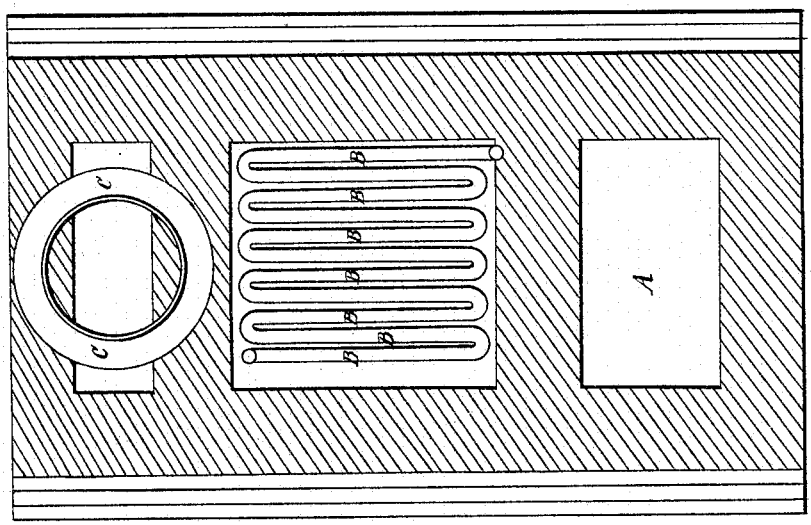
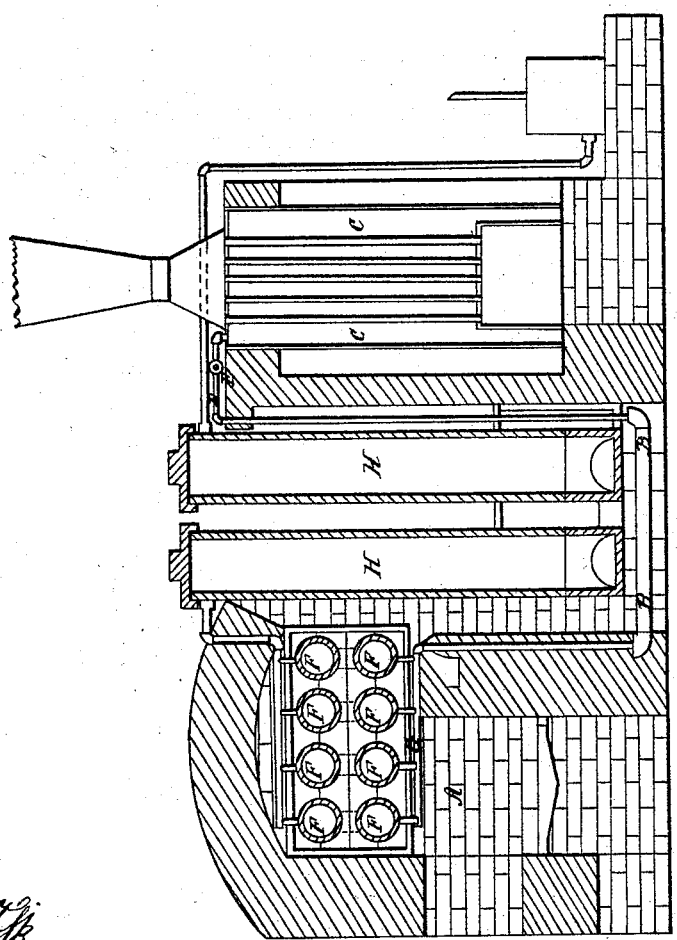
Witnesses:
Inventor:
John A. Bassett.

UNITED STATES PATENT OFFICE.

JOHN A. BASSETT, OF SALEM, MASSACHUSETTS.

IMPROVEMENT IN THE MANUFACTURE OF GASES FOR ILLUMINATING AND OTHER PURPOSES.

Specification forming part of Letters Patent No. 35,807, dated July 8, 1862.

*To all whom it may concern:*

Be it known that I, JOHN A. BASSETT, of Salem, in the county of Essex and State of Massachusetts, have invented a new and useful Improvement in the Preparation of Hydrogen and other Gases Obtained from the Decomposition of Steam; and I do hereby declare the following to be a full and exact description of the same, reference being had to the accompanying drawings, making part of this specification, in which—

Figure 1 is a vertical, and Fig. 2 a horizontal, section of the apparatus employed.

Similar letters of reference indicate corresponding parts in both views.

The nature of my invention consists in a new method of obtaining in abundance hydrogen and other gases by the thorough decomposition of steam under such conditions that the oxygen shall form a minimum of carbonic acid, the intermixture of which is injurious, and, as in most of the well-known hydrocarbon-gas processes, when formed in abundance, entails considerable waste of gas, expense for purification, wastes more of the carbon used in decomposition, and exerts a powerful effect in vitiating and diminishing the brilliancy of the light; and this object I accomplish in the most perfect manner by highly heating the steam previous to its entering the decomposing-retort, passing it through coils of pipe so arranged as to be heated by the waste heat of the furnace up or nearly up to the temperature of the retort in which it is to be decomposed. It is obvious that if the steam is heated up to the temperature of the retort previous to its entrance no cooling of the same will take place, and the decomposition will go on continuously with but little production of carbonic acid. My experience in this matter has been that by keeping the carbon in the retorts at about 1600° the decomposition of the steam into hydrogen and carbonic oxide is perfect and continuous; and this object is accomplished by using the heat in various parts of the furnace, which would be otherwise wasted and lost, to raise the temperature of the steam up to a point where it will not cool the carbon below the decomposing temperature, a low temperature being the first step in the production of carbonic acid. The pipes, therefore, through which the steam passes for the purpose of superheating are progressively hotter as they approach the retort, and the heat of the steam just before issuing into the retort should be about 1500° By superheating the steam previous to its entering the retort the formation of carbonic-oxide gas goes on unintermittingly and in large proportion; and as a water-gas of proper proportions to be carbonized should be half hydrogen and half carbonic oxide, the value of this improvement is very manifest, and in the preparation of hydrocarbon gas is very important; and the object of the present invention relates specially to the means used to accomplish this result, as will be described.

To enable others skilled in the art to make and use my invention, I will proceed to describe the same with reference to the drawings annexed, which show in section an apparatus by which it may be practically used and carried out, and also show its application to the manufacture of hydrocarbon gas, as illustrated in my patent of January 3, 1860.

I place in the lower part of the furnace A a set of superheating-pipes, B, in the form of a reverse coil. The steam passes into these pipes from the boiler C through the pipe D, the supply being controlled by the valve E. These superheating-pipes should be made of sufficient size to allow of the expansion of the steam by reason of its increased temperature. Thus the pipe from the boiler C may be three-eighths of an inch internal diameter, and the superheating-pipes should be an inch and a half internal diameter. In practice I have found these proportions to work satisfactorily and properly. These pipes are represented in the drawings to be at the bottom of the furnace, directly in the main flue; but their position, as well as their number, may be varied without altering the nature of the invention. They may be placed in any part of the furnace where heat would be otherwise lost and wasted by absorption by the brick-work and radiation, and in any number that is desired, for the more perfect the superheating the more perfect the result attained; but in practice the number and size indicated will be found sufficient and in proportion to the general arrangement and construction of the apparatus. These pipes may be made of clay or graphite, or of clay and graphite mixed, or other material having little affinity for oxygen, and therefore may be more durable and may be exposed to a higher heat without injury. The walls of the furnace near the fire-box may be lined with a series of these tubes, and in this way great economy of fuel will be attained. In case these pipes are made of clay or graphite, as suggested, the ends should be supplied with flanges for the connection with the iron pipe of the boiler and of the retorts nearly in the same manner as clay retorts are connected with the iron mouth-piece.

The pressure on this apparatus never at any time exceeds ten inches of water, and therefore may be used without fear of fracture or explosion, as pipes of this size may be made to sustain a pressure of twenty pounds above the atmosphere with safety. If iron pipes are used, which I have used with great success, it is obvious that cast is superior to wrought iron, as it is not attacked by oxygen so much. This highly-heated steam passes from these superheaters into the decomposing-retorts F by the pipe G. These pipes or decomposing-retorts are circular, are four inches internal diameter and fifty inches long, and are placed so as to receive the direct heat of the fire, a high temperature being required. The hot steam here meets the red-hot carbon and is decomposed with great rapidity.

It is probable that the first product of decomposition is hydrogen and carbonic acid, which is instantly changed into carbonic oxide in presence of the incandescent charcoal. It should here be stated that no decrease of temperature of these retorts takes place.

Accurate and careful examination fails to reveal any cooling of the retorts from the time the steam is allowed to enter until the exhaustion of the charge, which is believed to be one evidence of thorough and perfect decomposition into carbonic oxide and not carbonic acid. No interruption takes place in the decomposition. It goes on uninterruptedly, the quantity produced not varying from the first to the last, and the production of carbonic acid not increasing toward the last of the charge, as is always the case when the steam is admitted to the retort direct from the boiler in the usual hydro carbon-gas processes.

The freedom of the gas from carbonic acid may be judged of from the fact that if one thousand feet of the gas be passed through two and one-half pounds of lime-water a very small precipitate is made, and works constructed according to the general plan submitted are capable of producing upon an average at least twenty thousand feet of gas per day. No purification by lime or any substance to remove carbonic acid is used except water. The gas is simply washed with cold water and passed to the gas holder or applied to any desired use.

It is obvious that the steam after being superheated should be passed directly into the retorts, as if the steam were required to traverse any long length of pipe exposed to the atmosphere, it would be cooled so as to vitiate its property for ready decomposition. The water being decomposed the gases may be applied to any purpose desired.

In the drawings are represented two upright retorts, H, which are filled with carbon or any substance to increase the heated surface, and being supplied with the vapor of a liquid hydro carbon in any suitable manner, the gases are passed through them according to my patent of January 3, 1860, producing a permanent illuminating-gas; but the hydrogen and carbonic oxide, being nearly free from carbonic acid and of light specific gravity, are applicable to many useful purposes, and especially useful for saturation with hydro carbon vapor, so as to be applicable for illuminating purposes by any of the ordinary methods now in use.

Having thus fully described the nature of my invention, what I claim therein as new, and desire to secure by Letters Patent in the manufacture of hydro carbon gas by a continuous process, is—

Preserving a uniform high temperature in the decomposing-retort by the employment of steam superheated immediately previous to its introduction into said chamber and introduced before its temperature is materially lowered, by means of apparatus constructed and arranged substantially as herein shown and described.

JOHN A. BASSETT.

Witnesses:
JOHN RYAN,
JAMES McGEARY.